US010138656B2

(12) United States Patent
Dente et al.

(10) Patent No.: US 10,138,656 B2
(45) Date of Patent: Nov. 27, 2018

(54) CRASH MANAGEMENT SYSTEM AND METHOD IN AN ELECTRONIC LATCH OF A MOTOR-VEHICLE CLOSURE DEVICE

(71) Applicant: Magna Closures Inc., Newmarket (CA)

(72) Inventors: Davide Dente, Pisa (IT); Antonio Frello, Leghorn (IT)

(73) Assignee: MAGNA CLOSURES INC., Newmarket (CA)

( * ) Notice: Subject to any disclaimer, the term of this patent is extended or adjusted under 35 U.S.C. 154(b) by 126 days.

(21) Appl. No.: 14/653,210

(22) PCT Filed: Dec. 24, 2013

(86) PCT No.: PCT/EP2013/077988
§ 371 (c)(1),
(2) Date: Jun. 17, 2015

(87) PCT Pub. No.: WO2014/102279
PCT Pub. Date: Jul. 3, 2014

(65) Prior Publication Data

US 2015/0330111 A1 Nov. 19, 2015

Related U.S. Application Data

(60) Provisional application No. 61/748,262, filed on Jan. 2, 2013, provisional application No. 61/748,274, filed
(Continued)

(30) Foreign Application Priority Data

Dec. 24, 2012 (IT) .............................. TO2012A1143
Dec. 24, 2012 (IT) .............................. TO2012A1144
Dec. 24, 2012 (IT) .............................. TO2012A1145

(51) Int. Cl.
*E05B 77/12* (2014.01)
*E05B 81/86* (2014.01)
(Continued)

(52) U.S. Cl.
CPC .......... *E05B 77/12* (2013.01); *B60L 11/1861* (2013.01); *B60L 11/1864* (2013.01);
(Continued)

(58) Field of Classification Search
None
See application file for complete search history.

(56) References Cited

U.S. PATENT DOCUMENTS

2004/0124027 A1* 7/2004 Aiyama .................. E05B 77/12 180/274
2007/0199760 A1 8/2007 Kamlya
(Continued)

FOREIGN PATENT DOCUMENTS

DE 19916733 A1 10/2000
DE 20121915 U1 10/2003
(Continued)

*Primary Examiner* — Todd M Melton
*Assistant Examiner* — Jason R Roberson
(74) *Attorney, Agent, or Firm* — Dickinson Wright PLLC

(57) ABSTRACT

An electronic latch assembly for a closure device of a motor vehicle, having an actuator group operable for actuation of the closure device and an electric motor controllable to drive the actuator group (6). The electronic latch assembly has a backup energy source, and a control unit controlling the electric motor and the backup energy source to provide a backup supply voltage ($V_{sc}$) during an emergency operating condition. The control unit is configured to enter an emergency mode to cause disabling of actuation of the closure device, upon detecting the occurrence of the emergency operating condition, and to maintain disabled the actuation of the closure device, during the emergency operating condition.

25 Claims, 5 Drawing Sheets

Related U.S. Application Data on Jan. 2, 2013, provisional application No. 61/748, 286, filed on Jan. 2, 2013.

(51) Int. Cl.

*E05B 81/14* (2014.01)
*H02J 7/00* (2006.01)
*B60L 11/18* (2006.01)
*H02J 7/34* (2006.01)

(52) U.S. Cl.

CPC .......... *B60L 11/1872* (2013.01); *E05B 81/14* (2013.01); *E05B 81/86* (2013.01); *H02J 7/0052* (2013.01); *H02J 7/345* (2013.01)

(56) References Cited

U.S. PATENT DOCUMENTS

2011/0087413 A1* 4/2011 McCrickard ............. B60T 7/20 701/70
2011/0175376 A1* 7/2011 Whitens .................... B60R 7/06 292/251.5
2011/0254361 A1* 10/2011 Scharmann ............. B60T 8/405 303/10
2011/0278867 A1* 11/2011 Watanabe ............... E05B 81/06 292/341.16
2014/0175813 A1 6/2014 Margheritti et al.

FOREIGN PATENT DOCUMENTS

JP H09273342 A 10/1997
JP 2000064685 A 2/2000
JP 2001303821 A 10/2001
JP 2003239599 A 8/2003
JP 2007009625 A 1/2007
JP 2007030650 A 2/2007
JP 2008005662 A 1/2008
JP 2009144441 A 7/2009
JP 2009257008 A 11/2009
JP 2010126966 A 6/2010
WO WO2005047628 A1 5/2005
WO WO2011148732 A1 12/2011

* cited by examiner

VEHICLE MANAGEMENT UNIT
CONTROL CIRCUIT
$V_{batt}$
Sd
M
6d
6c
6a
6b
6
10
11
12
14
1
2
3
4
5
15

CRASH MANAGEMENT SYSTEM AND METHOD IN AN ELECTRONIC LATCH OF A MOTOR-VEHICLE CLOSURE DEVICE

CROSS REFERENCE TO RELATED APPLICATION

This application is a National Stage of International Application No. PCT/EP2013/077988 filed Dec. 24, 2013 and which claims the benefit and priority of Italian. Patent Application Nos. T02012A001143, TO2012A001144, and TO2012A001145 all filed Dec. 24, 2012 and U.S. Provisional Application No. 61/748,262, U.S. Provisional Application No. 61/748,274, and U.S. Provisional Application No. 61/748,286 all filed Jan. 2, 2013. The entire disclosure of each of the above applications is incorporated herein by reference.

TECHNICAL FIELD

The present invention relates to a crash management system and method in an electronic latch (commonly known as e-latch) of a motor-vehicle closure device.

BACKGROUND ART

In the following description and the accompanying claims, the expression "closure device" will be used to generally indicate any element movable between an open position and a closed position, respectively opening and closing an access to an inner compartment of a motor vehicle, therefore including, boot, rear hatches, bonnet lid or other closed compartments, window regulators, sunroofs, in addition to the side doors of a motor vehicle, to which the following description will make explicit reference, purely by way of example.

It is known that electrical latches are provided in motor vehicles, for example for controlling opening and closing of the side doors.

An electrical door latch generally envisages a ratchet that is selectively rotatable with respect to a striker fixed to a door post, in order to latch and unlatch the door. The electrical door latch includes a pawl that selectively engages the ratchet to prevent the ratchet from rotating. The electrical door latch includes an electric motor, which is electrically connected to a main electric power supply of the vehicle (tor example to the 12 V battery of the same vehicle), in order to directly or indirectly drive the pawl, via an electrically-operated actuator.

As it is known, a common problem related to electrical latches is that of controlling, as it is also required by security regulations, opening and closing of the doors even in case of emergency situations, such as in case of an accident or crash involving the vehicle.

In particular, during a vehicle crash or other emergency situation, vehicle doors have to be kept closed independently of handle activations or other user or external interventions, so that the electrical latches should be in a so called "double lock" status, while after the crash it should be possible to open the vehicle doors, so that the electrical latches should be promptly brought back to the unlocked status.

In conventional systems, crash management is performed by the main management unit of the vehicle (also known as "vehicle body computer"), which is configured to detect a crash situation by means of crash sensors, and issues suitable control signals to the electrical latches (in particular to the electric motors thereof), in order to drive a double lock during the crash situation and then to cause the unlocking of the electrical latches after the crash.

However, during the emergency situation, failure of the main power supply of the vehicle, or interruptions or breaking of the electrical connection between the main power supply and/or the main management unit of the vehicle and the electric latches, may occur; also, the same vehicle management unit may be subject to damages during the emergency situation.

In that case, the latch management procedure could fail and therefore a reliable and safe operation of the electrical latch assembly could not be assured.

Possible solutions to this problem may envisage a complex handle design, in order to filter peaks of acceleration (or other sensed quantities), which may be due to inertia or impacts during the crash (a solution known as "inertia catch", that prevents door from unlatching during high impact loads).

However, this solution usually entails the presence of redundant mechanical mechanisms with higher area occupation and weight and additional costs, and also represents a further constriction for designing of the vehicle doors.

Other solutions, as disclosed for example in US 2004/0124027 A1 and US 2007/0199760 A1 envisage the use of a control unit to manage lock/unlock of electronic lock apparatus for vehicle doors, in particular during a crash situation; the control unit is mounted in the vehicle door and coupled to the electronic lock apparatus. However, these solutions are not easy to realize, and do not cope in any manner with the problem of possible failure of the main power supply of the vehicle during the crash.

Moreover, US 2011/0175376 A1 relates to a solution applied to a glove box compartment in the vehicle, which envisages the use of an electronically controlled magnet to increase the magnetic closure resistance of the compartment and avoid unintentional opening of the same compartment during a collision. However, this solution cannot be applied to vehicle doors and to electronic locks thereof, and, again, does not cope in any manner with the problem of possible failure of the main power supply of the vehicle during the crash. Therefore, among other things, a need is felt in the field for an optimized and reliable crash management for an electric latch in a motor vehicle.

DISCLOSURE OF INVENTION

It is thus an object of certain aspects of the present invention to provide an electronic latch, designed to meet the aforementioned need.

This object can be achieved by an electronic latch, and a related control method, as defined in the appended claims.

BRIEF DESCRIPTION OF THE DRAWINGS

A preferred, non-limiting embodiment of certain aspects of the present invention will be described by way of example with reference to the accompanying drawings, in which.

BEST MODE FOR CARRYING OUT THE INVENTION

Figure 1:
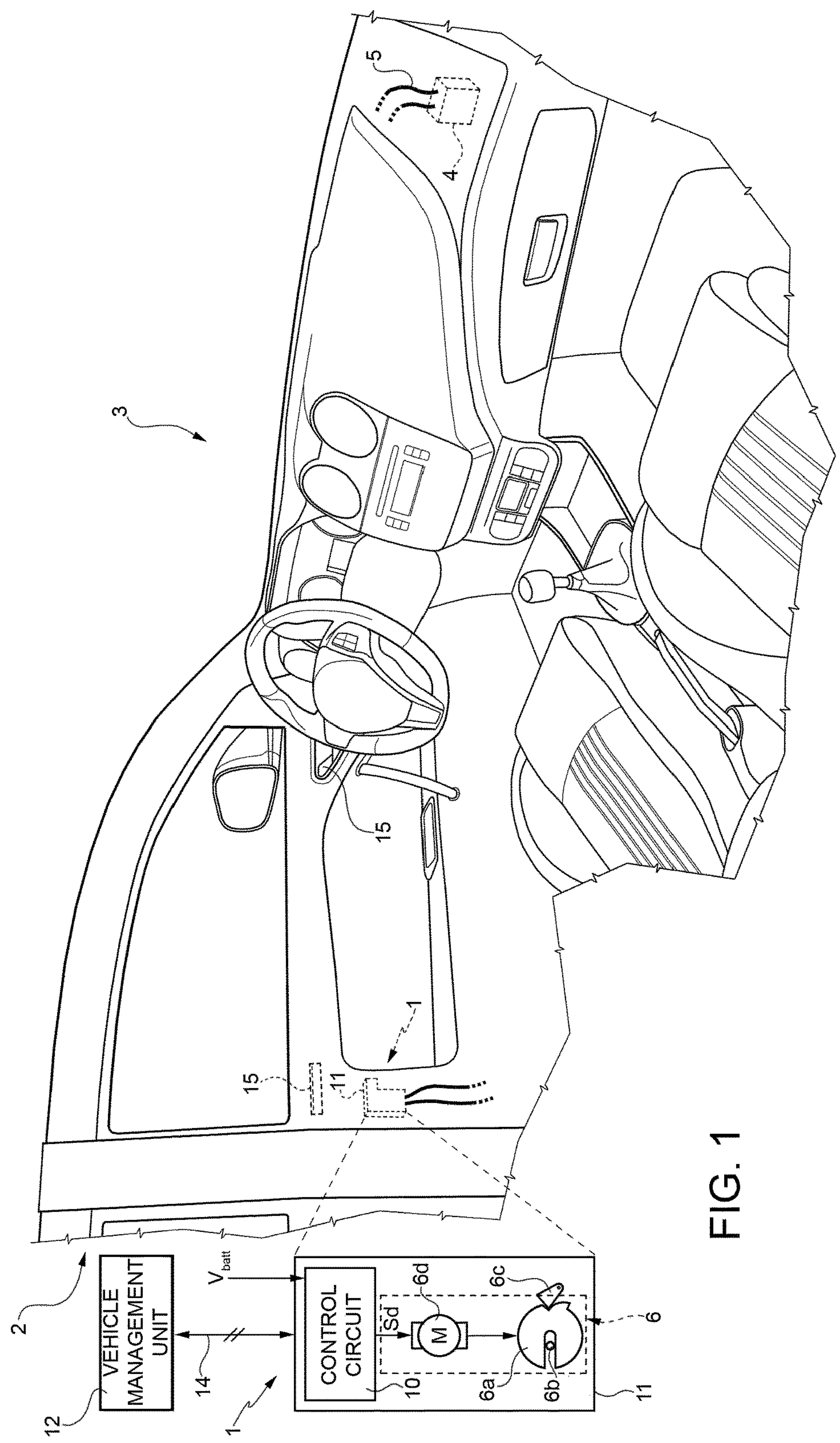
FIG. 1 is a schematic representation of a motor vehicle with a closure device and a related e-latch assembly.
Figure 2:
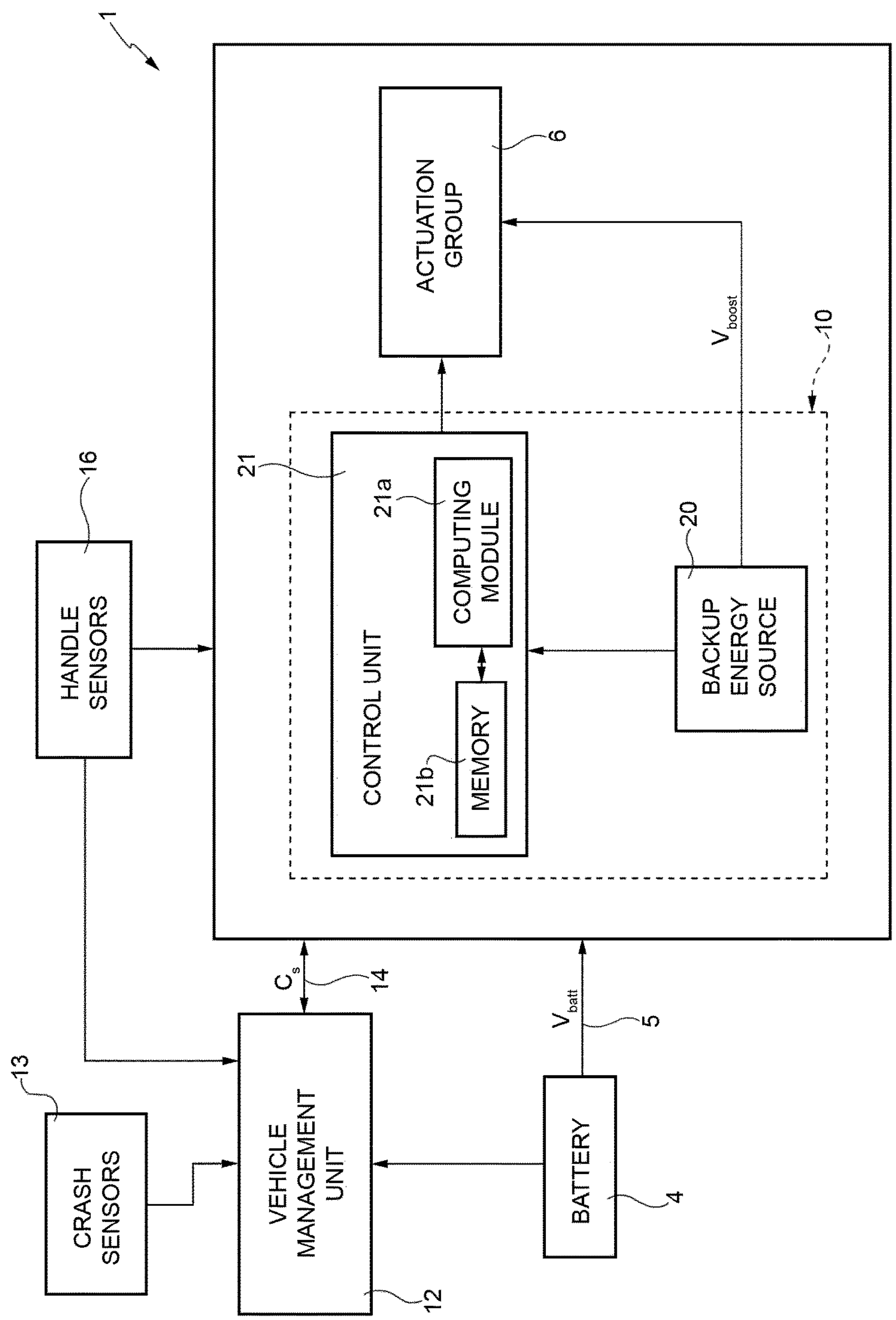
FIG. 2 is a more detailed block diagram of an electronic control circuit of the e-latch assembly of FIG. 1.

Number 1 in FIGS. 1 and 2 indicates as a whole an electronic latch assembly (hereinafter e-latch assembly 1), coupled to a door 2 of a motor vehicle 3 (however, it is again underlined that the e-latch assembly 1 may equally be coupled to any kind of closure device of the motor vehicle 3).

The e-latch assembly 1 is electrically connected to a main power source 4 of the motor vehicle 3, for example a main battery providing a battery voltage $V_{batt}$ of 12 V, through an electrical connection element 5, for example a power cable (the main power source 4 may equally include a different source of electrical energy within the motor vehicle 3, for example an alternator).

The e-latch assembly 1 includes an actuation group 6 including an electric motor, operable to control actuation of the door 2 (or in general of the vehicle closure device).

In a possible embodiment, the actuation group 6 includes a ratchet 6*a*, which is selectively rotatable to engage a striker 6*b* (fixed to the body of the motor vehicle 3, for example to the so called "A pillar" or "B pillar", in a manner not shown in detail). When the ratchet 6*a* is rotated into a latching position with respect to the striker 6*b*, the door 2 is in a closed operating state. A pawl 6*c* selectively engages the ratchet 6*b* to prevent it from rotating, directly or indirectly driven by an electric motor 6*d* so as to move between an engaged position and a non-engaged position.

The e-latch assembly 1 further includes an electronic control circuit 10, for example including, as discussed in detail hereinafter, a microcontroller or other known computing unit, which, in a possible embodiment, is conveniently embedded and arranged in a same housing or case 11 (shown schematically) together with the actuation group 6 of the e-latch assembly 1, thus providing an integrated compact and easy-to-assemble unit.

The electronic control circuit 10 is coupled to the actuation group 6 and provides to the electric motor 6*d* suitable driving signals $S_d$.

The electronic control circuit 10 is electrically coupled to a vehicle management unit 12, which is configured to control general operation of the motor vehicle 3, via an electrical connection element 14, for example a data bus, so as to exchange signals, data, commands and/or information.

The vehicle management unit 12 is also coupled to crash sensors 13, for example accelerometer or force sensors, which provide signals, for example acceleration or force signals, which indicate the presence of an emergency situation, such as a crash.

Conveniently, the electronic control circuit 10 also receives feedback information about the latch actuation from position sensors (not shown), such as Hall sensors, configured to detect the operating position, for example of the ratchet 6*b* and/or pawl 6*c*; and also receives (directly and/or indirectly via the vehicle management unit 12) information about the actuation of the vehicle (external and/or internal) handles 15 from handle sensors 16, which detect user activation of the internal and/or external handles 15 of the doors 2 of the motor vehicle 3.

The electronic control circuit 10 is also coupled to the main power source 4 of the motor vehicle 3, so as to receive the battery voltage $V_{batt}$; the electronic control circuit 10 is able to check if the value of the battery voltage $V_{batt}$ decreases below a predetermined threshold value.

According to an aspect of the present solution; the electronic control circuit 10 includes an embedded and integrated backup energy source 20, which is configured to supply electrical energy to the latch electric motor 6*d* and to the same electronic control circuit 10, in case of failure or interruption of the main power source 4 of the motor vehicle 3.

This backup energy source 20 is usually kept in a charged state during normal operation, by the main power source 4, so as to be readily available as soon as the need arises, for example in case of a crash.

In more details, the electronic control circuit 10 includes a control unit 21, for example provided with a microcontroller, microprocessor or analogous computing module 21*a*, coupled to the backup energy source 20 and the actuation group 6 of the e-latch assembly 1 (providing thereto the driving signal $S_d$), to control their operation.

The control, unit 21 has an embedded memory 21*b*, for example a non-volatile random access memory, coupled to the computing module 21*a*, storing suitable programs and computer instructions (for example in the form of a firmware). It is recognized that the control unit 21 could alternatively comprise a logical circuit of discrete components to carry out the functions of the computing module 21*a* and memory 21*b*.

In a known manner (here not discussed in detail), the control unit 21 is configured to control the e-latch assembly 1 for controlling actuation of the door 2, based on signals detected by the handle sensors 16, which are indicative for example of the user intention to open the door 2 of the motor vehicle 3, and based on signals received from the vehicle management unit 12, which are indicative for example of a correct authentication of the user carrying suitable authentication means (such as in a key fob).

According to a particular aspect of the present solution, the control unit 21 is also configured to manage a crash situation and to implement, locally to the e-latch assembly 1, a suitable control algorithm to control the same e-latch assembly 1 without external intervention by the vehicle management unit 12.

In particular, the control unit after receiving from the vehicle management unit 12 an emergency signal $C_s$, indicative of the occurrence of an emergency situation (such as a crash), is able to start a crash management procedure, internally to the e-latch assembly 1, in order to prevent opening of the doors 2 of the motor vehicle 3 (thus causing disabling of the handles 15) for a pre-set amount of time.

The crash management procedure can execute independently from the availability of the main power source 4 of the motor vehicle 3, and the battery voltage $V_{batt}$, thanks to the presence of the backup energy source 20, internally within the e-latch assembly 1, and independently from any failure of the electrical connections between the same e-latch assembly 1 and the vehicle management unit 12 and/or from failures of the same vehicle management unit 12.

After the pre-set time (if there is no on-going emergency signal $C_s$), enabling of the handles 15 is again determined by the control unit 21.

Figure 3:
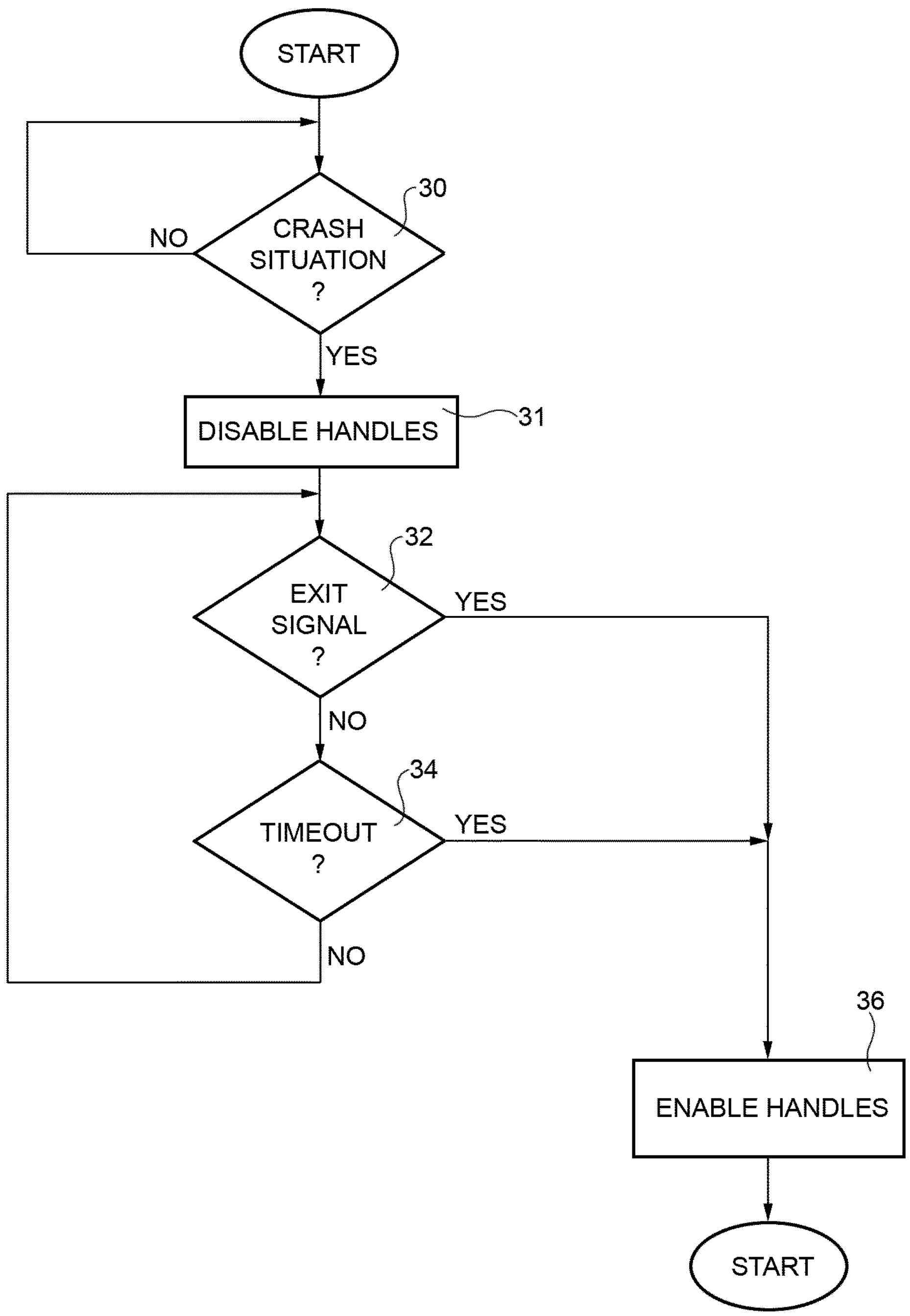
FIG. 3 is a flow chart relating to a crash-management procedure implemented in the electronic control circuit of FIG. 2.

In detail, and as shown in FIG. 3, the crash management procedure implemented by the control unit 21, locally to the e-latch assembly 1, envisages a first step, 30, where the control unit 21 waits for the occurrence of an emergency situation, for example by monitoring the emergency signal $C_s$ received from the vehicle management unit 12.

The emergency signal $C_s$ may be generated by the vehicle management unit 12 in any known manner, for example based on the signals detected by crash sensors 13.

Advantageously, the emergency signal $C_s$ is received at an interrupt port of the control unit 21, so as to be promptly and immediately processed by the same control unit 21.

After the emergency signal $C_s$ is received, the control unit 21 starts the crash management procedure and proceeds to a crash mode, causing disabling, step 31, of operation of the (external and/or internal) handles 15 of the motor vehicle 3, or in general be opening of the doors 2.

For example, the e-latch assembly 1 is controlled to maintain the door 2 in a closed operating state, independently from the user actuation on the handles 15, sensed by the handle sensors 16; to this end, the control unit 21 is configured to disable the actuation group 6 from actuating the striker 6*b* of, or any other mechanical latching element coupled to, door 2 and/or the electric motor 6*d* from driving the actuation group 6. In a possible solution, the control unit 21 may keep reading the handle sensors 16, and, during crash mode, avoid any electric motor or other means of actuations (intended to release or open doors 2).

The handles 15 being thus disabled, any unwanted release (opening) of the vehicle doors 2 due to inertia or impacts during crash can be avoided. Therefore, even if the handles 15 or related power release switches are activated during the crash, no release of the doors 2 may occur.

Due to security requirements, after a crash it shall be possible to open at least one door 2 per not-crashed vehicle side.

Therefore, the crash management procedure implemented by the control unit 21 is designed to exit the crash mode, whenever one of the following two alternative situations occur:

- as monitored at step 32, the emergency signal $C_s$ (or another different signal, in general an "exit signal", received from the vehicle management unit 12 on the data bus 14), having a suitable value, signals the end of the emergency condition on the motor vehicle 3;
- as monitored at step 34, a crash timeout, that is a pre-set time period counted by the control unit 21 (via an internal clock), for example in the order of some seconds, for example 5 to 20 seconds depending on the type of crash (low speed, roll over, etc.), expires.

In particular, exit from the crash mode is determined by the first of the above situations to occur.

The crash timeout allows to exit the crash mode even in case of failure of the electrical connection between the e-latch assembly 1 and the vehicle management unit 12 and/or of failure of the same vehicle management unit 12.

After the preset time period has expired, and if there is no on-going crash, and no new emergency conditions are detected, the control unit 21 may automatically cause enabling of handles 15, at step 36.

According to a possible solution, the e-latch assembly 1 is controlled in a normal operating state, whereby the actuation by the handles 15 is once again enabled and causes corresponding actions in the e-latch assembly 1.

The backup energy source 20 embedded in the electronic control circuit 10 of the e-latch assembly 1 allows the crash mode to be completely independent from any vehicle parts outside the same e-latch assembly 1. The crash procedure has only to be "started" by the vehicle management unit 12; afterwards, the control unit 21 in the e-latch assembly is able to manage the crash mode autonomously.

During crash mode, the control unit 21 may also be configured to enter a low power mode, in order to save backup energy in case of loss of the connection to the main power source 4 or of failure of the same main power source 4; for example, a wakeup condition originated from the handle sensors 16 may be disabled (that is interrupt activation due to the detection signals coming from the handle sensors 16 may be disabled).

Figure 4:
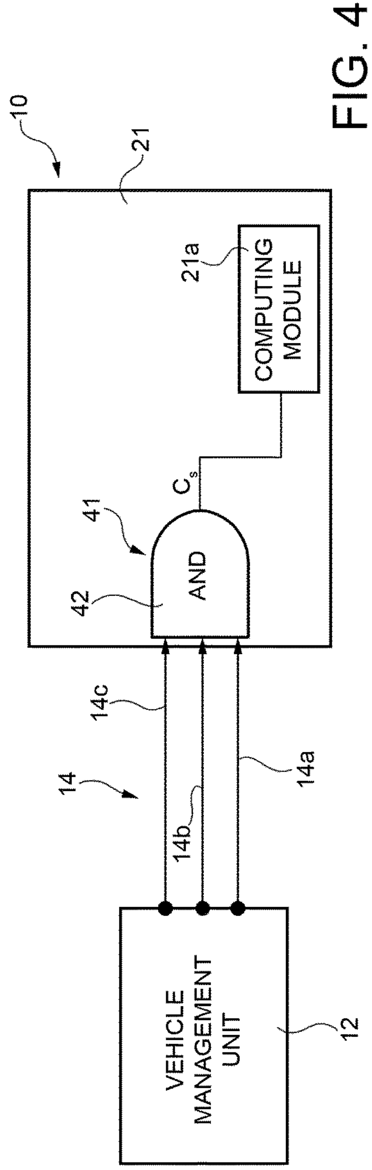
FIG. 4 shows a possible embodiment of a crash signal generation module in the electronic control circuit of FIG. 2.

FIG. 4 schematically shows a possible embodiment of a crash signal generation module 41, implemented in the control unit 21 of the electronic control circuit 10 of the e-latch assembly 1, which does not require any relevant modification of the vehicle management unit 12 for generation of the crash signal $C_s$.

This solution is advantageous, since it allows mounting of the improved e-latch assembly 1 (with embedded control unit 21), without any other hardware modification being required in the motor vehicle 3.

In particular, the electrical connection element 14 coupling the vehicle management unit 12 to the e-latch assembly 1 includes here analog signal lines, that may be present in the motor vehicle 3, denoted with 14*a*, 14*b*, 14*c*: for example a lock signal line 14*a*, an unlock signal line 14*b* and a double-lock signal line 14*c*. In a known manner, here not discussed in detail, signals on these lines are commonly used to drive lock/unlock electric motors in conventional latch assemblies.

In order to signal the presence of an emergency situation, the vehicle management unit 12 may be configured to set all the analog signal lines 14*a*, 14*b*. 14*c* to a high level (condition, which is never satisfied during normal operation), for example to the battery voltage $V_{batt}$, so that the control unit 21 may be able to start the crash mode in the event that, at step 30, a high level of all the analog signal lines 14*a*, 14*b*, 14*c* is detected.

As shown in FIG. 4, the crash signal generation module 41 may include an AND logic gate 42 to generate the crash signal $C_s$, as a logic signal, to be received at an interrupt port of the computing module 21*a* of the control unit 21, starting from the value of the signals received on the analog signal lines 14*a*, 14*b*, 14*c*.

The AND logic gate 42 has three input terminals, each coupled to a respective one of the analog signal lines 14*a*, 14*b*, 14*c*, and one output terminal coupled to the interrupt port (or in general to a high priority input) of the computing module 21*a* and providing the crash signal $C_s$.

As soon as a high level of the crash signal $C_s$ is received, the control unit 21 may thus enter the crash mode, enable the backup energy source 20, disable the handles 15, and start counting the pre-set time to automatically exit the crash mode after expiry of the crash timeout.

Figure 5:
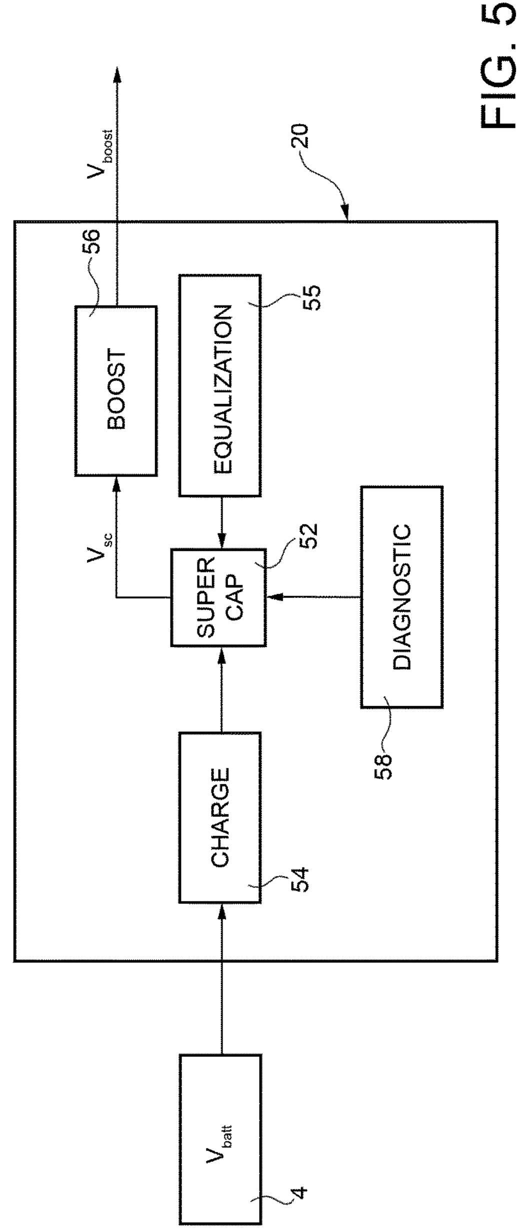
FIG. 5 is a block diagram of at embodiment of a backup energy source embedded in the e-latch assembly of FIG. 1.
Figure 6:
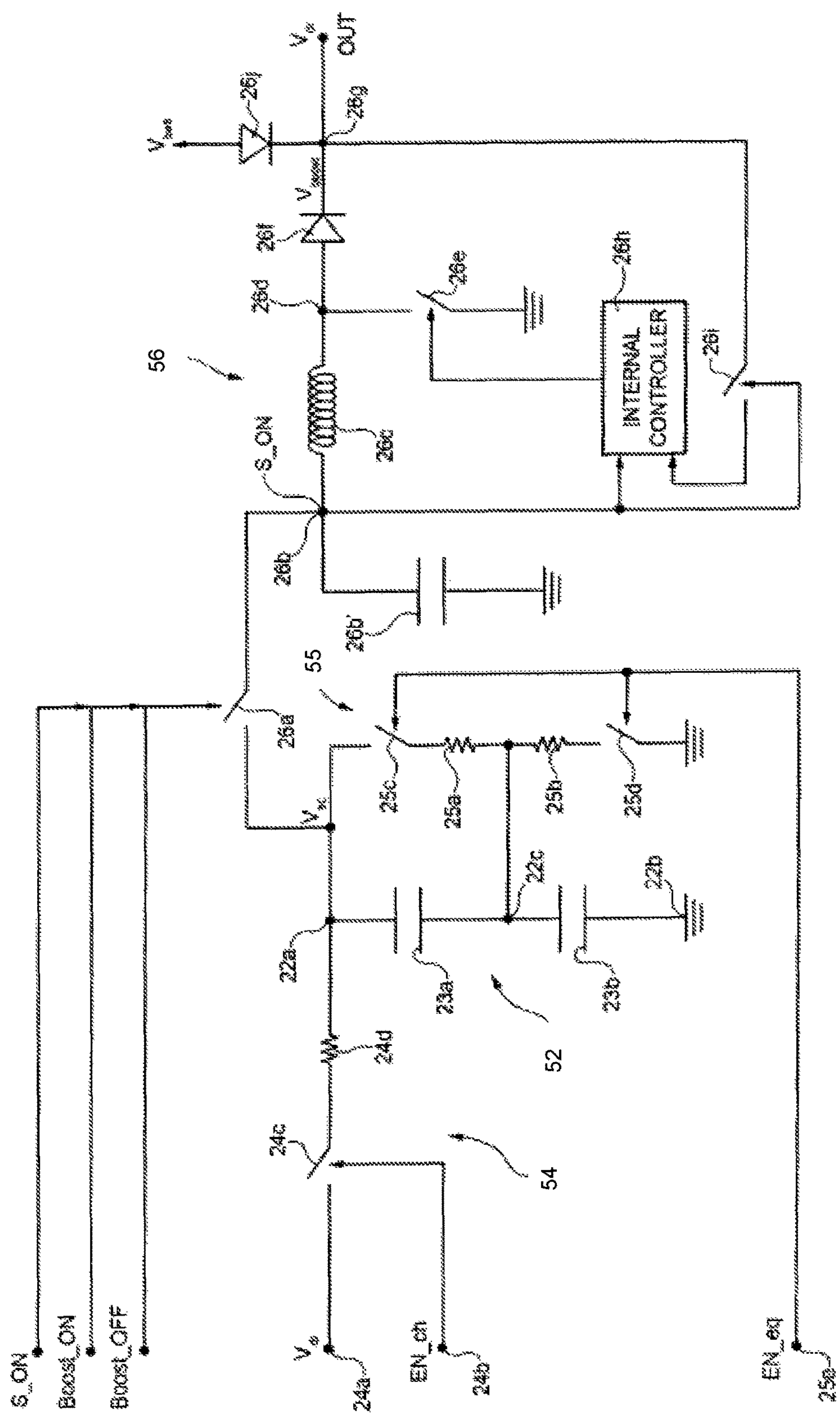
FIG. 6 is a circuit diagram of the electronic control circuit of FIG. 2.

A possible embodiment of the backup energy source 20 is now discussed, with reference to FIG. 5.

The backup energy source 20 includes a group of low voltage supercapacitors 52 (hereinafter supercap group 52), as an energy supply unit (or energy tank) to provide power backup to the e-latch assembly 1, even in case of power failures of the main power source 4. Supercapacitors may include electrolytic double layer capacitors, pseudocapacitors or a combination thereof. Supercapacitors advantageously provide high energy density, high output current capability and have no memory effects; moreover, supercapacitors have small size and are easy to integrate, have extended temperature range, long lifetime and may withstand a very high number of charging cycles. Supercapacitors are not toxic and do not entail explosive or fire risks, thus being suited for hazardous conditions, such as for automotive applications.

In a possible embodiment, the supercap group 52 may include two supercapacitor cells, connected in series, each providing, when charged, a voltage level for example of 2,5 V-2,7 V, in order to jointly provide a supercap voltage $V_{sc}$, for example in the order of 3 V-5 V, which may be used as a backup power supply for the e-latch assembly 1, in emergency situations, when the energy from the main power source 4 of the motor vehicle 3 is not available. Supercapacitor cells are thus of a low voltage type and also have a high capacity, for example in the order of 16 F-20 F, for example 18 F.

The backup energy source 20 further includes a charge module 54; an equalization module 55 and a boost module 56.

The charge module 54 is electrically coupled to the supercap group 52 and is configured to continuously recharge, starting from the battery voltage $V_{batt}$, when power from the main power source 4 is available, the supercap group 52, so that the same supercap group 52 may offer a full energy storage for emergency situations and any leakage currents are compensated.

The equalization module 55 is electrically coupled to the supercap group 52, and is configured to ensure that both supercapacitor cells have a desired cell voltage value, in particular a same cell voltage value during operation (to achieve a balanced operating condition). The equalization module 55 also avoids that supercapacitor cells have a cell voltage over a maximum desired cell voltage level, protecting the supercapacitors against overcharging.

The boost module 56 receives at its input the supercap voltage $V_{sc}$ generated by the supercap group 52, and is configured to boost, that is to increase, its value up to automotive standard voltages (for example 9 V-16 V), and to provide enough output current capability to drive standard automotive electric motors, such as the electric motor 6*d* of the e-latch assembly 1.

Indeed, the supercap voltage $V_{sc}$ may be too low to provide an effective back-up power source to drive the electric motor 6*d* in emergency situations, like lost or insufficient power supply from main power source 4 of the motor vehicle 3. The boost module 56 thus provides at its output (that is also the output of the backup energy source 20) a boosted voltage $V_{boost}$, as a function of the supercap voltage $V_{sc}$.

The boost Module 56 is implemented, in a possible embodiment, by a PWM boost converter (or dc-dc step up converter), and includes an enabling switch 26*a*, e.g. a MOSFET solid state switch, connected between the first node 22*a* of the supercap group 22, thus receiving the supercap voltage V at a first intermediate node 26*b*.

A storage capacitor 26*b* is coupled to the first intermediate node 26*b*, and is charged to the supercap voltage $V_{sc}$ when the enabling switch 26*a* is closed, defining on the same intermediate node 26*b* a self -activation signal S_ON, having a high voltage value.

The enabling switch 25*a* has a control terminal receiving a boost disabling signal boost_OFF from the control unit 21 of the electronic control circuit 10; during normal operation, when the main power source 4 is available, the boost disabling signal boost_OFF disables, and keeps in the OFF state, the PWM boost converter, since the sensed battery voltage $V_{batt}$ is not critical.

The control terminal of the enabling switch 26*a* also receives a boost enabling signal boost_ON, whose value is determined by external user events (i.e. it is not generated by the control unit 21, internally to the electronic control circuit 10), and the activation signal S_ON.

The boost module 56, after being activated, is self maintained in an ON state, in particular by the high value of the activation signal S_ON, until it is switched off by the control unit 21 of the electronic control circuit 10, when backup energy is no more needed or energy is to be kept stored in the supercap group 52.

According to a possible embodiment, the boost enabling signal boost_ON switches to the ON state, thus enabling the PWM boost converter, as soon as the handle -reading sensors 16 detects user activation of the internal or external handles 15 of a side door 2 of the motor vehicle 3; therefore, during an emergency situation, when there is a failure it the main power source 4, the backup energy source 20 is promptly available for supplying the e-latch assembly 1.

In particular, the boost module 56 includes: a boost inductor element 26*c* connected between the first intermediate node 26*b* and a second intermediate node 26*d*; a boost switch 26*e*, e.g. a solid state switch like a MOSFET switch, connected between the second intermediate node 26*d* and the ground reference potential and having a control terminal; and a boost diode element 26*f*, connected between the second intermediate node 26*d* and an output node 26*g* (also representing an output terminal OUT for the whole backup energy source 20), on which the boosted Voltage $V_{boost}$ is selectively provided.

According to an aspect of the present solution, the boost module 56 further includes an internal controller 26*h*, in particular a PWM controller, which is configured to provide a PWM control signal to the control terminal of the boost switch 26*e*, so as to control its boosting operation (in a known manner; here not discussed in detail).

The internal controller 26*h* is coupled to the first intermediate node 26*b*, to receive the supercap voltage $V_{sc}$ and is able to autonomously manage boost activation and deactivation, thereby making it possible to enable the backup energy source 20 even without any further action from the control unit 21 of the electronic control circuit 10.

A feedback switch 26*i* is connected between the output node 26*g* and the internal controller 26*h* to provide feedback on the value of the boosted voltage $V_{boost}$.

The control terminal of the feedback switch 26*i* is also coupled to the first intermediate node 26*b*, to receive the activation signal S_ON, when the enabling switch 26*a* is closed.

When switched to the closed state by the supercap voltage $V_{sc}$ a feedback path is defined, to allow a closed loop voltage regulation by the internal controller 26*h* (a voltage divider, not shown, implemented via partition resistors, may be present, to provide the voltage feedback from the boosted voltage $V_{boost}$).

The feedback switch 26*i* returns to the open state, as soon as the boost module 56 is deactivated, so as to reduce the power consumption over the feedback path, which is indeed interrupted.

The boost module 56 further includes a selection diode 26*j*, having its cathode terminal connected to the output node 26*g* and its anode terminal receiving the battery voltage $V_{batt}$.

Accordingly, on the output terminal OUT of the backup energy source 20, the highest between the battery voltage $V_{batt}$ and the boosted voltage $V_{boost}$ is provided, as the driving voltage $V_{dr}$, which will then drive the electric motor 9 of the e-latch assembly 1 (and also charge the supercap group 52).

The boosted voltage $V_{boost}$ is then received by an output module, not shown, of the electronic control circuit 10, for example including an integrated H-bridge, whose output drives the electric motor 6*d* of the e-latch assembly 1.

The backup energy source 20 further includes a diagnostic module 58, which is operatively coupled to the supercap group 52 and is configured to monitor the health status of the supercapacitors during the charging process, by measuring their temperature, voltage value, capacitance value and/or internal equivalent resistance (DCR—Direct Current Resistance).

The diagnostic module 58 is also coupled to the control unit 21, to provide diagnostic information thereto, for example including the value of the supercap voltage $V_{sc}$. In a possible embodiment, not shown, the diagnostic module 58 may be implemented in the control unit 21, as a diagnostic routine run by the microprocessor or microcontroller thereof.

The advantages of the discussed solution are clear from the foregoing description.

In particular, an increase of safety in the crash management may be achieved, during and after the crash or any other kind of emergency situation involving the motor vehicle 3.

Indeed, the control unit 21 in the electronic control circuit 10 of the e-latch assembly 1 may be able to manage the crash mode independently from the vehicle management unit 12 or any vehicle parts outside the same e-latch assembly 1.

Accordingly, any failure affecting the vehicle management unit 12 and/or the main power source 4 of the motor vehicle 3 does not affect the proper management of the vehicle closure devices (for example the door 2), even during emergency situations.

The use of supercapacitors may allow to achieve high energy density, high capacity and high output current capability, and avoids memory effects and minimize consumption and recharge time. Life time of the supercapacitor group is also very high, thus allowing the use thereof as a reliable backup energy source, without requiring additional backup power sources. The use of low voltage supercapacitors, for example of the type commonly available in the market, may also allow to reduce the costs of the system and improve its maintainability.

The use of supercapacitors may allow to provide the backup energy source in a cheap, light and small package; the resultant size and form factor of the energy backup source is such as to allow integration within the same case of the e-latch assembly, together with a respective control unit, designed to manage the emergency situations.

Embodiments according to the present description may not entail any modification of the vehicle management unit 12 or any vehicle parts outside the e-latch assembly 1; only a software modification may be required in the vehicle management unit 12 for suitable generation of the crash signal $C_s$, designed to start the crash management procedure.

The discussed solution may allow to achieve a simpler and cheaper design of the doors 2 of the motor vehicle 1, in particular concerning the handles 15 thereof.

In particular, arrangement of the control unit and the backup power source within the electronic latch makes up for a compact and easy to integrate solution, which may also allow easy upgrading of existing vehicles.

Clearly, changes may be made to what is described and illustrated herein without, however, departing from the scope defined in the accompanying claims.

In particular, it is again underlined that the e-latch assembly 1 may operate any kind of closure devices within the motor vehicle 3, different from the doors 2 thereof.

During the emergency situation, causing disabling of the operation of the (external and/or internal) handles 15 of the motor vehicle 3, or in general opening of the doors 2, may also be implemented by the control unit 21 by controlling any suitable physical disabling means coupled to the doors 2 and/or the handles 15 and/or the actuation group 6 thereof (the disabling means being configured to to mechanically prevent opening of the same doors 2).

The invention claimed is:

1. An electronic latch assembly for a closure device of a motor vehicle, including an electric motor, a control unit and a backup energy source and coupled to a vehicle main power source and configured to provide a backup supply voltage ($V_{sc}$) to the control unit during an emergency operating condition, wherein the emergency operating condition comprises the vehicle main power source not being available, wherein the control unit is configured to enter an emergency mode to cause disabling of actuation of the closure device, upon detecting the occurrence of the emergency operating condition, and to maintain disabled the actuation of the closure device, during the emergency operating condition;

wherein the backup energy source and the control unit are arranged internally of the electronic latch assembly, wherein the backup energy source includes a boost module and a supercapacitor group and the boost module is configured to receive at its input the backup supply voltage ($V_{sc}$) generated by the supercapacitor group, and is configured to increase the backup supply voltage ($V_{sc}$) to drive the electric motor of the latch assembly.

2. The electronic latch assembly according to claim 1, wherein the control unit is configured to autonomously manage the emergency mode during the emergency operating condition, locally to the electronic latch assembly, independently from an external main management unit of the motor vehicle and independently from the availability of a main power source of the motor vehicle.

3. The electronic latch assembly according to claim 1, wherein the electronic latch assembly includes a case, and wherein the backup energy source and the control unit are arranged within the case.

4. The electronic latch assembly according to claim 1, wherein the backup energy source includes a supercapacitor group, configured to store energy during a normal operating condition whereby the electronic latch assembly is designed to be supplied by a main power source of the motor vehicle providing a main supply voltage ($V_{batt}$), and configured to provide the backup supply voltage ($V_{sc}$) to supply the electronic latch assembly during the emergency operating condition.

5. The electronic latch assembly according to claim 1, wherein the emergency operating condition includes a crash or an accident involving the motor vehicle.

6. The electronic latch assembly according to claim 1, further comprising an actuator group operable to control actuation of the closure device, and an electric motor controllable to drive the actuator group, wherein the control unit, in the emergency mode, is configured to disable either the actuator group from controlling actuation of the closure device or the electric motor from driving the actuator group, or to disable both the actuator group and the electric motor.

7. The electronic latch assembly according to claim 1, wherein the control unit is configured to receive an emergency signal ($C_s$) from an external main management unit of the motor vehicle on a communication line, the emergency signal ($C_s$) being indicative of the emergency operating condition, and to enter the emergency mode, upon receipt of the emergency signal ($C_s$).

8. The electronic latch assembly according to claim 7, wherein the control unit is coupled to an external main management unit of the motor vehicle via a communication line including at least a first and a second signal lines and is configured to detect occurrence of the emergency operating condition, and to enter the emergency mode, upon sensing one of a logical high voltage level and a battery voltage on both the first and the second signal lines, the logical high voltage level being greater than a logical low voltage level set during a normal operating condition.

9. The electronic latch assembly :according to claim 7, wherein the control unit is configured to exit the emergency mode to cause enabling of actuation of the closure device, upon the first to occur of the following conditions: the reception of an exit signal indicative of the end of the emergency operating condition from the external main management unit of the motor vehicle on the communication line; and the expiry of a pre-set time period from the start of the emergency mode.

10. The electronic latch assembly according to claim 1, wherein the control unit is configured to exit the emergency mode to cause enabling of actuation of the closure device upon the expiry of a pre-set time period from the start of the emergency mode.

11. The electronic latch assembly according to claim 1, wherein the control unit is configured to implement a reduced-power operation during the emergency mode in order to save energy of the backup energy source.

12. The electronic latch assembly according to claim 1, wherein the control unit, in the emergency mode, is configured to maintain disabled the actuation of the closure device, independently from user or external intervention on the closure device, or on parts thereof.

13. The electronic latch assembly according to claim 1, wherein the electronic latch assembly includes a case, and wherein the backup energy source and the control unit are arranged within the case, together with an actuation group, the actuation group including a ratchet which is selectively rotatable to engage a striker coupled to the closure device, a pawl selectively engaging the ratchet to prevent it from rotating, and being directly or indirectly driven by an electric motor so as to move between an engaged position and a non -engaged position, wherein the backup energy source is configured to provide the backup supply voltage ($V_{sc}$) to the control unit and the electric motor.

14. A motor vehicle, including a closure device and an electronic latch assembly coupled to the closure device, according to claim 1.

15. A method for controlling an electronic latch assembly for a closure device of motor vehicle and coupled to a vehicle main power source and including an electric motor, and a control unit arranged within the electronic latch assembly, wherein a backup energy source is also arranged to provide a backup supply voltage ($V_{sc}$) to the control unit during an emergency operating condition, wherein the emergency operating condition comprises the vehicle main power source not being available, wherein the backup energy source includes a boost module and a supercapacitor group, the boost module configured to receive at its input the backup supply voltage ($V_{sc}$) generated by the supercapacitor group, and is configured to increase the backup supply voltage ($V_{sc}$) to drive the electric motor of the electronic latch assembly, the steps of the method comprising:

detecting the occurrence an emergency operating condition;

entering an emergency mode to cause disabling of actuation of the closure device, upon detecting the occurrence of emergency operating condition; and maintaining disabled the actuation of the closure device, during the emergency operating condition.

16. The. method according to claim 15, wherein the steps of entering and maintaining are implemented by the control unit locally to the electronic latch assembly, independently from an external main management unit of the motor vehicle and independently from the availability of a main power source of the motor vehicle.

17. The method according to claim 15, wherein detecting the occurrence of the emergency operating condition includes receiving, at the control unit, an emergency signal ($C_s$) from an external main management unit of the motor vehicle on a communication line.

18. The method according to claim 17 including exiting the emergency mode to cause enabling of actuation of the closure device, upon the first to occur of the following conditions: the reception of an exit signal indicative of the end of the emergency operating condition from the external main management unit of the motor vehicle on the communication line; and the expiry of a pre-set time period from the start of the emergency mode.

19. The method according to claim 15 including exiting the emergency mode to cause enabling of actuation of the closure device upon the expiry of a pre-set time period from the start of the emergency mode.

20. The electronic latch assembly according according to claim 1, wherein the boost module is configured to boost the backup supply voltage ($V_{sc}$) value up to automotive standard voltages ranging between 9 V to 16 V.

21. The electronic latch assembly according to claim 1, wherein the boost module provides at its output a boosted voltage $V_{boost}$, as a function of the supercap voltage $V_{sc}$.

22. The electronic latch assembly according to claim 1, wherein the boosted voltage $V_{boost}$ is the output of the backup energy source.

23. The electronic latch assembly according to claim 1, wherein the supercapacitor group comprises a capacitance ranging between 16 Farads to 20 Farads.

24. The electronic latch assembly according to claim 1, wherein the boost module includes a boost voltage converter, having an internal controller and a boost-activation switch element selectively enabled to activate the internal controller to implement the boosting operation, by an external signal indicative of an external operation on the closure device;

wherein the internal controller is configured to maintain the boosting operation, until deactivated by the control unit via a deactivation signal.

25. The electronic latch assembly according to claim 1, wherein the boost module is a pulse width modulation boost converter.

* * * * *